United States Patent [19]

Mazzei et al.

[11] Patent Number: 5,622,545

[45] Date of Patent: Apr. 22, 1997

[54] SEPARATOR FOR REMOVING GASES FROM WATER

[75] Inventors: Angelo L. Mazzei, Bakersfield; Steven D. Ford, Clovis, both of Calif.

[73] Assignee: Claude Laval Corporation, Fresno, Calif.; by said Steven Ford

[21] Appl. No.: 425,112

[22] Filed: Apr. 21, 1995

[51] Int. Cl.⁶ .................................................. B01D 19/00
[52] U.S. Cl. ............................ 96/210; 55/459.4; 95/261; 96/212; 96/216
[58] Field of Search ................................ 95/261; 96/208, 96/209, 210, 212, 213, 216; 55/459.5, 459.4, 459.2

[56] References Cited

U.S. PATENT DOCUMENTS

| | | | |
|---|---|---|---|
| 2,578,568 | 12/1951 | Mayer et al. | 96/210 |
| 2,849,930 | 9/1958 | Freeman et al. | 96/209 |
| 3,151,961 | 10/1964 | Blackmore et al. | 96/210 |
| 3,215,165 | 11/1965 | Boadway | 55/459.5 |
| 3,359,708 | 12/1967 | Barber | 96/210 |
| 3,513,642 | 5/1970 | Cornett | 55/459.5 |
| 3,771,288 | 11/1973 | Wisman et al. | 96/210 |
| 3,771,290 | 11/1973 | Stetham | 96/210 |
| 5,203,891 | 4/1993 | Lema | 96/210 |
| 5,338,341 | 8/1994 | Mazzei et al. | 96/208 |

*Primary Examiner*—Jay H. Woo
*Assistant Examiner*—Duane S. Smith
*Attorney, Agent, or Firm*—Donald D. Mon

[57] ABSTRACT

A dynamic separator for removing gases from water includes a vortex tube with an internal cylindrical wall along which a stream of water is directed in a downward helical path. A perforated separator tube extends along the center of the vortex tube and receives gases which flow toward the center. The gases rise and are released. The water is drained from the bottom. An injector nozzle injects water tangentially in an injection section from which the whirling stream enters the vortex tube.

8 Claims, 2 Drawing Sheets

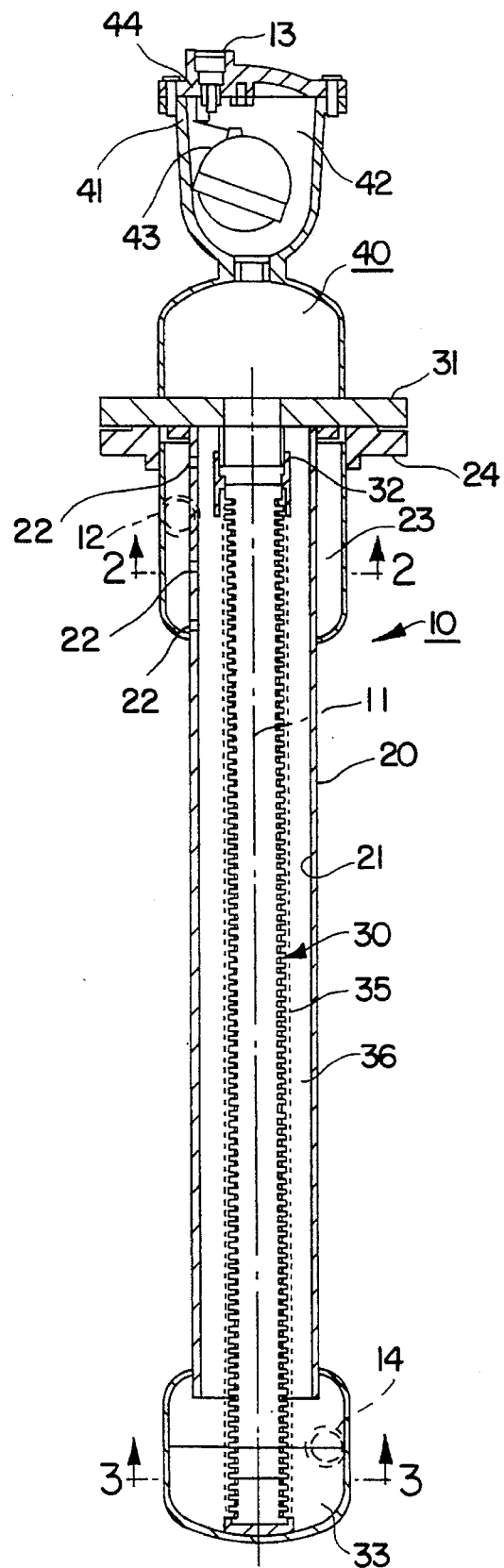
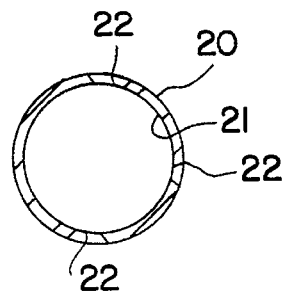
FIG. 2
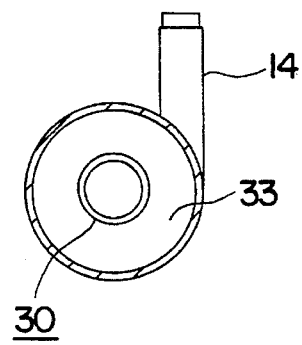
FIG. 3
FIG. 1
PRIOR ART

SEPARATOR FOR REMOVING GASES FROM WATER

FIELD OF THE INVENTION

This invention relates to the removal of gases from water.

BACKGROUND OF THE INVENTION

U.S. Pat. No. 5,338,341, issued Aug. 16, 1994 to Angelo L. Mazzei and Steven D. Ford. In this patent there is disclosed a separator for removing gases from water. This invention is an improvement on that device. This patent is incorporated by reference herein in its entirety for its showing of that device.

The presence of dissolved or entrained gases in water streams is frequently encountered, and often is acceptable. However, there are systems in which gases are injected into the stream where they can result in serious problems.

An example is in the treatment of a flowing water stream with ozone. The ozone is generally injected into the water stream at about 2% of the remainder of a gas stream from whose oxygen the ozone was generated. The remainder of the gas stream is the remaining atmospheric gases, some of whose oxygen was converted into ozone in an ozone generator. This remainder is principally nitrogen and oxygen, along with lesser amounts of carbon dioxide and other atmospheric gases.

As a consequence, in order to inject relatively small amounts of ozone into the stream, significant amounts of air will also be injected, and will either be dissolved or entrained. This additional entrained air can result in nutrification in embolism of fish aquaculture and aquatic applications.

The above circumstances identify "chemical" reasons to remove gases from a flowing water stream. There are other reasons. The injection of air into potable water systems is commonly used as a means to remove iron and hydrogen sulphide from the water. Later it is desirable to remove the entrained air after the treatment process has been completed.

This invention is directed to the removal of gases from a water stream. It is primarily directed toward removal of air and of its component gases.

A flowing stream of water generally includes dissolved gases and entrained gases. The term "stream" includes any kind of flow open or within pressurized piping systems. This invention is most effective for removing entrained gases as a function of differential specific gravities. However, it is also effective for removing at least some dissolved gases as a function of a drop in pressure in the system, followed by their separation as a function of difference in specific gravities.

It is an object of this invention to provide an improved dynamic separator to remove gases from a flowing stream of water.

SUMMARY OF THE INVENTION

A separator according to this invention includes an elongated vortex tube having an axis and an axially extending cylindrical inner wall. Water is injected into the separator so that it spins downwardly through a vortex section to a collection chamber from which it exits the separator.

A separator tube extends axially through the vortex tube. It has an outer diameter smaller than the diameter of the inner wall of the vortex tube, and an internal passage which is open at its top. The vortex section is bound by the separator tube and the inner wall of the vortex tube. A plurality of perforations pass through the wall of the separator tube so that water and especially gases can flow into it.

The separator tube at its top end opens into a gas separator chamber. A relief valve provides for release of gas from the separator chamber.

According to a feature of this invention, an enlarged circular injection section is formed atop and concentric with the vortex section. An accelerator nozzle discharges water into the injection section at a high velocity. The outer diameter of the injection section is larger than the outer diameter of the inner wall of the vortex tube, so that the diameter of the injected rotating stream is reduced as it enters the vortex section.

According to the presently-preferred embodiment of the invention, the nozzle is fitted in the injection section, contiguous to its wall.

According to another embodiment of the invention, the nozzle is placed at and just outside of an entry port to the injection section.

This invention will be fully understood from the following detailed description and the accompanying drawings, in which:

BRIEF DESCRIPTION OF THE DRAWINGS

FIG. 1 is an axial cross-section of the separator disclosed in U.S. Pat. No. 5,338,341;

FIG. 2 is a lateral cross-section of one portion of the separator taken at line 2—2 in FIG. 1;

FIG. 3 is a lateral cross-section taken at line 3—3 in FIG. 1;

DETAILED DESCRIPTION OF THE INVENTION

Figure 7:
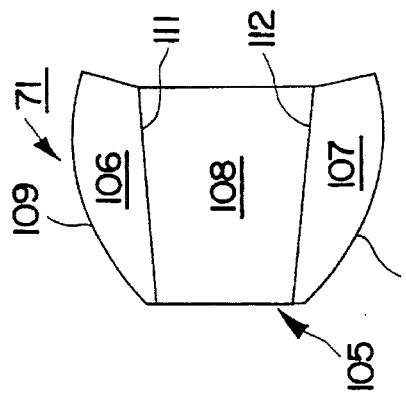
FIG. 7 is a flat template for the nozzle used in the separator of FIG. 5.

Separator 10 (FIG. 1) of said Mazzei et al U.S. Pat. No. 5,338,341 patent has a central axis 11 which is maintained upright during operation. It receives a supply of water through inlet port 12. Gases which are removed from the stream are discharged through a gas exit port 13 at the top of the separator. Water from which gases have been removed is discharged through outlet port 14 at the bottom of the separator.

A vortex tube 20 extends axially. It has a cylindrical inner wall 21. Near its upper end wall it is pierced by a plurality of injector ports 22 that pass through the wall in a tangential alignment. Preferably these are disposed around the periphery of the vortex tube.

A centrifuge chamber 23 surrounds the vortex tube at its upper end. It encloses ports 22, and constitutes water supply means. The inlet port supplies water under pressure to the centrifuge chamber. Conveniently the centrifuge chamber can be formed by a sleeve that is welded to the vortex tube and to a mounting flange 24.

Water is preferably supplied to the centrifuge chamber 23 through a supply line 25 which is tangentially directed into it. This gives the water an initial velocity as it enters injection ports 22. While it is not required that the water in chamber 23 have this initial rotational velocity, the tangential velocity imparted to it does reduce the energy loss required to force the water through ports 22. It is an advantage of this arrangement that the energy loss is minimized by this arrangement.

Water will be forced under pressure at a high velocity into the vortex tube to flow down the wall of the tube while rotating around the axis in a vortex mode. The water flows along the wall of the vortex tube in a helical path because of its centrifugal forces, and downwardly as the consequence of system pressure.

A separator tube 30 extends from collector chamber 33 upwardly in the vortex tube. It is sealed to a mounting flange 31 by means of a coupling 32. When the flanges are separated, the separator tube can be removed and replaced as necessary. Outlet port 14 drains the collector chamber.

The separator tube is pierced by a plurality of perforations 35. These preferably lie in vertical rows, and are preferably formed as arcuate slots. Three sets of these perforations can conveniently be provided, each extending about 60 degrees around the tube, with 30 degree imperforate portions between them.

The outer diameter of the separator tube is smaller than the internal diameter of the vortex tube, so as to leave a vortex section 36 between them.

A separation chamber 40 communicates with the separator tube as its top. It is conveniently formed as a closed dome with an air relief valve 41 in exit port 13. The air relief valve is a conventional float-operated valve which opens to release air when the water level in the separation chamber is too low. The valve has a valving chamber 42 which is a continuation of the separation chamber, a pivoted float 43, and a float responsive valve 44.

The improved separator 70 of this invention is shown in FIGS. 4–7. A comparison with the separator of FIGS. 1–3 will reveal that the principal distinction between them is the elimination of the upper portion of vortex tube 20, along with its injector ports 22. The other principal distinction is the provision of an accelerator nozzle 71 (FIGS. 4 and 6) which discharges tangentially into an injection section 72. Injection section 72 has a larger internal diameter than the internal diameter of vortex section 73.

In this embodiment, separator tube 74 has a smaller outside diameter than the inside diameter of either the injection section or of the vortex section.

Housing 80 is generally cylindrical. It includes a domed upper end 81 and a base 82. An inlet port 83 receives water from an inlet pipe 84. An outlet port 85 discharges water to an outlet pipe 86. Partitions 87 and 88 are end walls for sections yet to be described.

A vortex tube 90 terminates at an upper flange 91 and a lower flange 92. It has a cylindrical inner wall 93 that is coaxial with central axis 94. The housing has an inner wall 95 in an injection section 72, and an inner wall 97 in a collector section 98. The diameters of walls 95 and 97 are larger than the inside diameter of wall 93.

Separator tube 74 extends axially from partition 88, through partition 87, and discharges into separation chamber 90 and thence through vent port 100. Separator tube 74 is pierced by a plurality of perforations 101. These preferably lie in vertical rows and are preferably formed as arcuate slots. Three sets of these perforations can conveniently be provided, each extending about 60 degrees around the tube, with 30 degree imperforate regions between them.

The purpose of nozzle 71 is to convert an incoming circular stream to a flattened stream, directing a large portion of it close to the wall of the injection section, and directing it more uniformly along wall 95 with an increased velocity.

Figure 6:
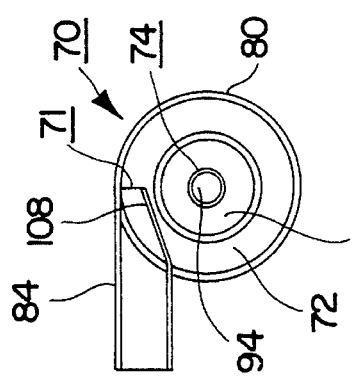
FIG. 6 is a cross-section taken at line 6—6 in FIG. 4.
Figure 4:
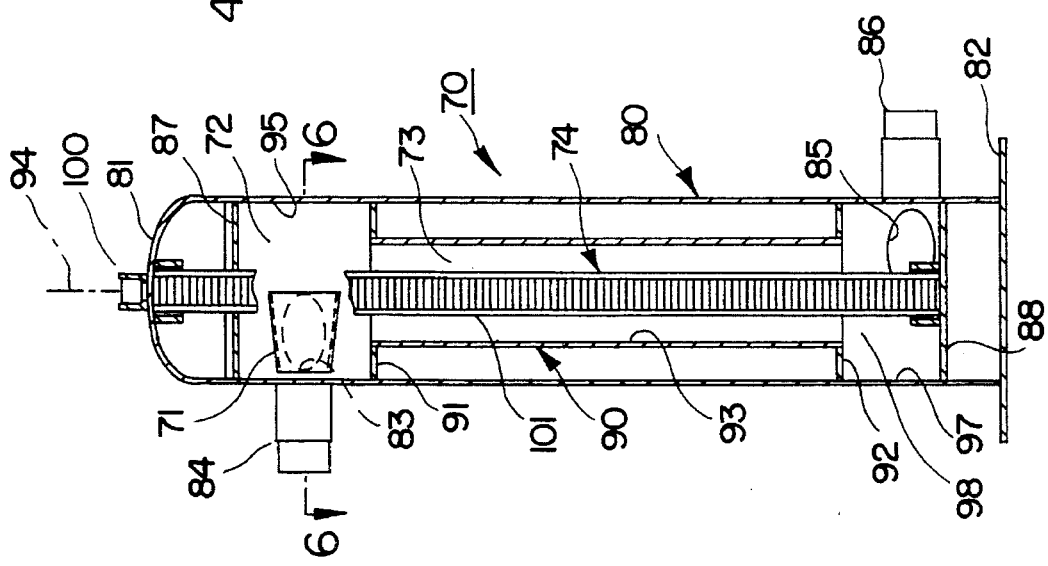
FIG. 4 is an axial cross-section of the presently-preferred embodiment of the invention.

A flat laid-out template 105 to form nozzle 71 is shown in FIG. 6. Skirt portions 106, 107 are on opposite sides of a deflector portion 108. Edges 109, 110 are curved so as to make a close fit with wall 95. Fold lines 111, 112 represent the locations where the flat blank is bent to form nozzle 71. Nozzle 71 is welded to wall 95. Notice that the stream enters tangentially so as to create a clockwise rotation of the injected water (viewed from line 6—6 in FIG. 4). Also notice that inlet port 83 and outlet pipe 86 receive water in the same rotational sense so as to facilitate discharge of the water. The spinning movement of the water is not hindered, and puddling of water in the collector chamber is minimized.

Attention is called to the benefits derived from providing the injection section with a larger diameter than the vortex section. The rotational velocity of the water in the injection section is a function of the velocity of the incoming water. The larger diameter provides some accommodation for surges. The water flowing in a circular pattern bears against the wall of the injection section. When the thickness of this annular layer is greater than the difference between the diameters of the injection section and the vortex section, water will flow down into the vortex section in a helical downward vortex path. Importantly the reduction in the radius of the whirling stream in the vortex section results in a conservation of angular momentum and an increased linear velocity, and a greater centrifugal force against the wall of the vortex section. This improves the separation of gases from the water.

When the whirling stream enters the collector section, it continues its circular motion and smoothly exits through the exit port. In this section the maximum rotational velocity is no longer of interest, because the separation of gases will have been completed.

Figure 8:
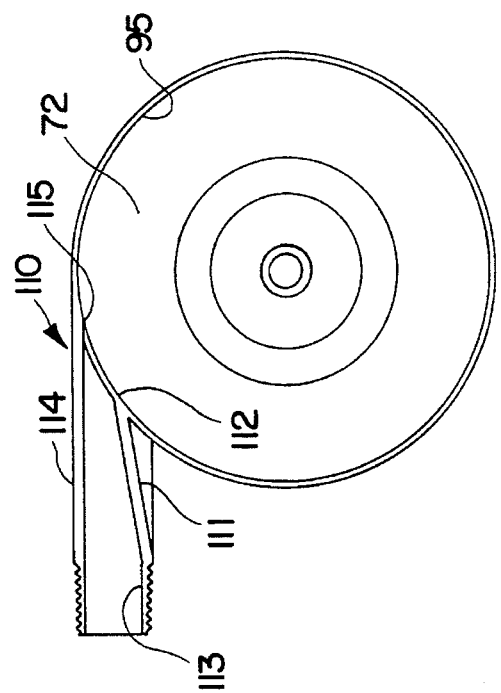
FIG. 8 is a cross-section similar to FIG. 6 showing another embodiment of the invention.
Figure 5:
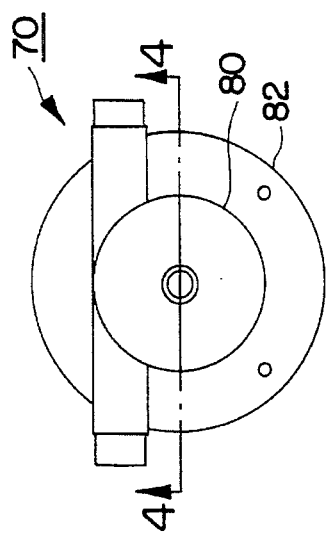
FIG. 5 is a top view of FIG. 4.

In the embodiments of FIGS. 4–7, the nozzle structure is inside the injection section. It is more convenient for some installations, such as for spas, to provide it just outside of the injection section, discharging a nozzle-accelerated stream tangentially into the injection section. FIG. 8 shows such an arrangement.

In FIG. 8, a nozzle 110 is formed by a flat plate 111 whose edge 112 lies in a line parallel to the central axis. It forms part of the wall 113 of an inlet pipe 114 whose axis is normal to a plane which contains the central axis, the outer edge 115 of the pipe fairs tangentially into the injection chamber so the stream from the nozzle is directed tangentially along the wall.

In operation the separator of all embodiments is flooded with water. As the consequence of the difference between the specific gravities of water and the gases, entrained gases tend to move toward the axis and through the perforations. The entrained gases include those which were initially present as bubbles and those which were released from solution as the consequence of change of pressure during injection into the separator, and in the flow paths in the separator.

The contents in the separator tube are water and a surprising amount of bubbles. The water in this tube is not particularly turbulent, because in passing through the perforations, much of the rotational velocity of that water has been dissipated. The bubbles rise quickly to the separation chamber. An air-water interface (not shown) is established in the separation chamber. As the air leaves the water and rises above it, it tends to force the water level down. The air relief valve is responsive to this situation, and releases air as necessary to allow the interface to rise to a predetermined level. An air relief valve will ordinarily be provided for the device of FIG. 4, the same as for the embodiment of FIG. 1.

The air relief valve may be physically located in the dome of the separation chamber, but is more readily serviced if it is physically attached to the dome above it. In that arrangement, the float chamber of the air relief valve will be part of the separation chamber. The interface will be established in it, and the exit port 13 is its own outlet port.

Thus this separator is a static device which injects a water stream into a vortex pattern, and provides a relatively quiescent region in which gases can rise to be discharged from the system after having been removed from solution or entrainment by the centrifugal action of the vortex stream.

The dimensions of the system are arbitrary, and can be scaled for different throughput rates and pressures. One suitable separator, which effectively treats about 20 gallons per minute with a 50 psig input has a vortex tube about 30 inches long, and an internal diameter of about 4 inches. The separator tube is about 28 inches long, with an external diameter of about 2¼ inches and an internal diameter of about 2 inches. The perforations may be horizontal slits about 3/16 inches wide spaced axially apart by about 3/8 inch, disposed in three axially extending rows. Minor experimentation with dimensions will produce optimal relationships for other systems.

This invention is not to be limited by the embodiments shown in the drawings and described in the description, which are given by way of example and not of limitation, but only in accordance with the scope of the appended claims.

We claim:

1. A separator for removing gases from a flowing liquid stream, comprising:

a housing having a central axis, a water inlet port, a water outlet port, and a gas release port;

an axially-extending upper inner wall defining an outer boundary of an injection section, said inlet port opening tangentially into said inner wall;

an axially-extending lower inner wall defining a collector section, said outlet port opening tangentially into said collector section, said ports being aligned in the same rotational sense relative to the central axis;

a vortex tube having an axially extending cylindrical wall extending only between said injector section and said collector section, all of said walls having a respective diameter, the diameter of the vortex tube wall being the smallest of the three diameters;

a separator tube having an axially extending internal cylindrical wall and an external cylindrical wall, said outer cylindrical wall having a diameter which is smaller than the diameter of the inner wall of the vortex tube so as to form an annular axially extending vortex section between said injector section and said collector section, a plurality of separator perforations extending between said walls of the separator tube, said inner wall of the separator tube forming a conduit in communication with said gas release port; and nozzle means in fluid communication with said water inlet port reducing the cross-section of an incoming stream of water and directing said stream tangentially onto said inner wall of the injection section, said nozzle means comprising structure inside said injector chambers, contiguous with the inner walls of the injection section, and including a flat plate whose plane is parallel to said central axis.

2. A separator according to claim 1 in which said housing includes an upper separator chamber with which said conduit and said gas release port communicate.

3. A separator according to claim 1 in which a disc-shaped partition extends between the inner wall of the injection section and the inner wall of the vortex tube to form between these walls, an abrupt reduction of diameter.

4. A separator according to claim 3 in which a tapered partition extends between the inner wall of the injection section and the inner wall of the vortex tube to form a gradual reduction of internal diameter.

5. A separator for removing gases from a flowing liquid stream, comprising:

a housing having a central axis, a water inlet port, a water outlet port, and a gas release port;

an axially-extending upper inner wall defining an outer boundary of an injection section, said inlet port opening tangentially into said inner wall;

an axially-extending lower inner wall defining a collector section, said outlet port opening tangentially into said collector section, said ports being aligned in the same rotational sense relative to the central axis;

a vortex tube having an axially extending cylindrical wall extending only between said injector section and said collector section, all of said walls having a respective diameter, the diameter of the vortex tube wall being the smallest;

a separator tube having an axially extending internal cylindrical wall and an external cylindrical wall, said outer cylindrical wall having a diameter which is smaller than the diameter of the inner wall of the vortex tube so as to form an annular axially extending vortex section between said injector section and said collector section, a plurality of separator perforations extending between said walls of the separator tube, said inner wall of the separator tube forming a conduit in communication with said gas release port; and nozzle means in fluid communication with said water inlet port reducing the cross-section of an incoming stream of water and directing said stream tangentially onto said inner wall of the injection section, said nozzle means comprising structure outside of said injection chamber through said inlet port, and including a flat plate whose plane is parallel to said central axis, and whose intersection with the wall of the injection section is a line that is parallel to the central axis.

6. A separator according to claim 5 in which said housing includes an upper separator chamber with which said conduit and said gas release port communicate.

7. A separator according to claim 5 in which a disc-shaped partition extends between the inner wall of the injection section and the inner wall of the vortex tube to form between these walls, an abrupt reduction of diameter.

8. A separator according to claim 7 in which a tapered partition extends between the inner wall of the injection section and the inner wall of the vortex tube to form a gradual reduction of internal diameter.

* * * * *